United States Patent
Woodward

(10) Patent No.: US 6,839,973 B1
(45) Date of Patent: Jan. 11, 2005

(54) MULTIPLE AXIS LEVELING DEVICE

(75) Inventor: Christopher M. Woodward, Pine Island, MN (US)

(73) Assignee: Christopher Woodward, Pine Island, MN (US)

(*) Notice: Subject to any disclaimer, the term of this patent is extended or adjusted under 35 U.S.C. 154(b) by 0 days.

(21) Appl. No.: 10/361,230

(22) Filed: Feb. 10, 2003

Related U.S. Application Data

(60) Provisional application No. 60/357,513, filed on Feb. 15, 2002.

(51) Int. Cl.[7] .............................................. G01C 9/00
(52) U.S. Cl. ............................. 33/371; 33/373; 33/343; 33/379
(58) Field of Search ......................... 33/370–373, 343, 33/347, 351, 369, 333, 354, 379

(56) References Cited

U.S. PATENT DOCUMENTS

| | | | |
|---|---|---|---|
| 2,824,381 A | | 2/1958 | Traupmann |
| 2,932,225 A | | 4/1960 | Gardner |
| 3,590,617 A | | 7/1971 | Mount |
| 4,274,203 A | | 6/1981 | Vasile |
| 4,274,208 A | * | 6/1981 | Yakkel ........................ 33/371 |
| 4,295,279 A | | 10/1981 | Sienknecht |
| 4,343,093 A | * | 8/1982 | Eadens ........................ 33/373 |
| 4,394,799 A | | 7/1983 | Moree et al. |
| 4,558,583 A | | 12/1985 | Shaw, Sr. et al. |
| 4,589,213 A | | 5/1986 | Woodward |
| 4,622,837 A | | 11/1986 | Bergman |
| 4,782,597 A | | 11/1988 | Mills |
| 4,813,149 A | | 3/1989 | Herkimer |
| 5,046,191 A | | 9/1991 | Serikow et al. |
| 5,058,407 A | | 10/1991 | Parker |
| 5,103,569 A | | 4/1992 | Leatherwood |
| 5,154,000 A | | 10/1992 | Mahoney et al. |
| 5,167,075 A | * | 12/1992 | Weldy et al. .................. 33/343 |
| 5,222,303 A | * | 6/1993 | Jardine ........................ 33/528 |
| 5,235,755 A | | 8/1993 | Fowler |
| 5,402,579 A | | 4/1995 | Smith |
| 5,507,098 A | * | 4/1996 | Schaver, Jr. .................. 33/371 |
| 5,749,151 A | | 5/1998 | Scott et al. |
| 5,769,561 A | | 6/1998 | Pettersson |
| 6,029,359 A | * | 2/2000 | Szumer ........................ 33/373 |
| 6,032,376 A | * | 3/2000 | Shurtleff ...................... 33/391 |
| 6,044,929 A | | 4/2000 | Wishner |
| 6,094,833 A | * | 8/2000 | Medley, Jr. .................. 33/770 |
| 6,131,298 A | | 10/2000 | McKinney et al. |
| 6,173,502 B1 | * | 1/2001 | Scarborough ................ 33/371 |
| 6,209,371 B1 | | 4/2001 | Guinn |
| 6,507,988 B1 | * | 1/2003 | Riviere ........................ 33/371 |

* cited by examiner

*Primary Examiner*—Diego Gutierrez
*Assistant Examiner*—Yaritza Guadalupe
(74) *Attorney, Agent, or Firm*—Haugen Law Firm PLLP

(57) ABSTRACT

A portable multiple-axis leveling device for removably attaching to selected objects includes a main body portion having a plurality of distinct alignment detection units disposed therein, with each alignment detection unit being configured to measure and display levelness along respective axes such that at least two distinct axes may be simultaneously measured for respective levelness without adjustment of the main body portion, and a clamping portion operably coupled to the main body portion, with the clamping portion having a recessed portion for receiving selected objects therein. The portable multiple-axis leveling device further includes a securement apparatus operably coupled to the clamping portion for removably securing the clamping portion to the respective selected object that is operably positioned in the recessed portion. The portable multiple-axis leveling device is preferably sufficiently portable to readily fit within a typical clothes pocket.

2 Claims, 2 Drawing Sheets

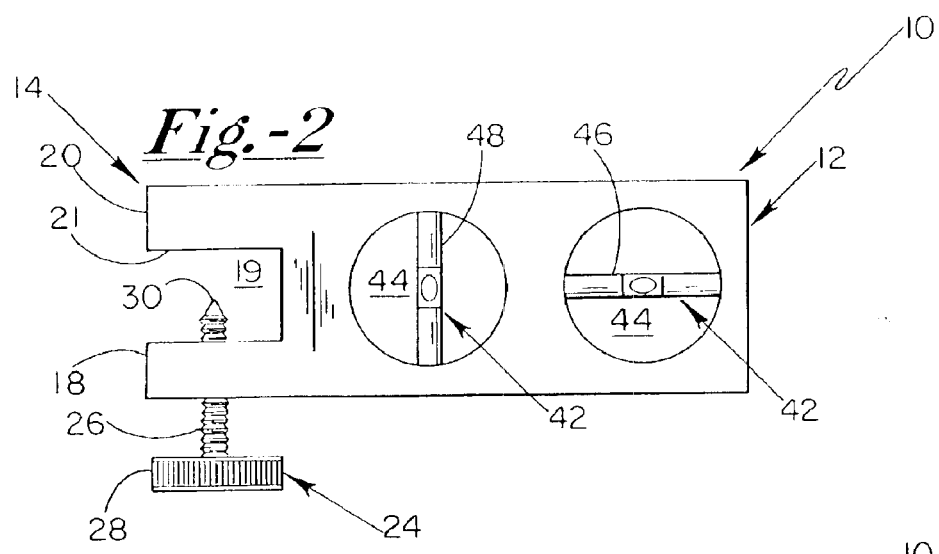
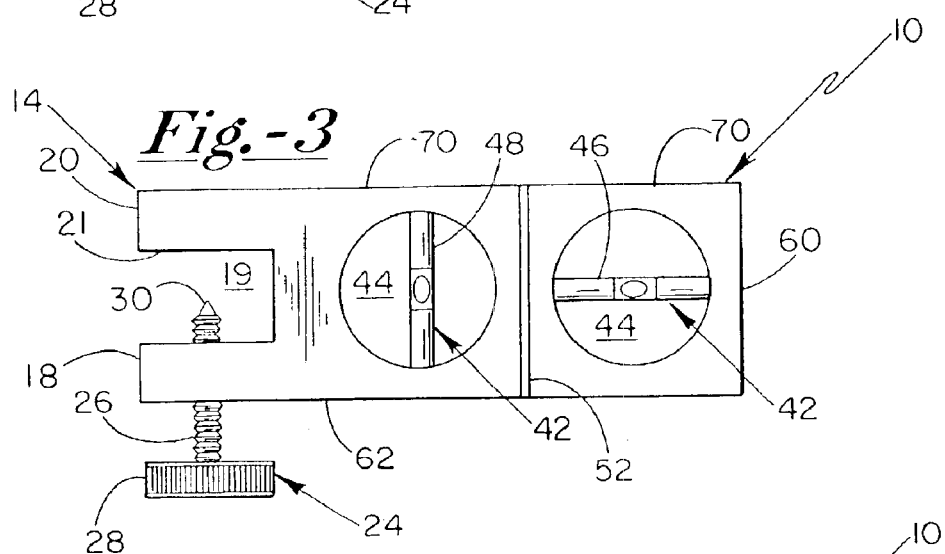
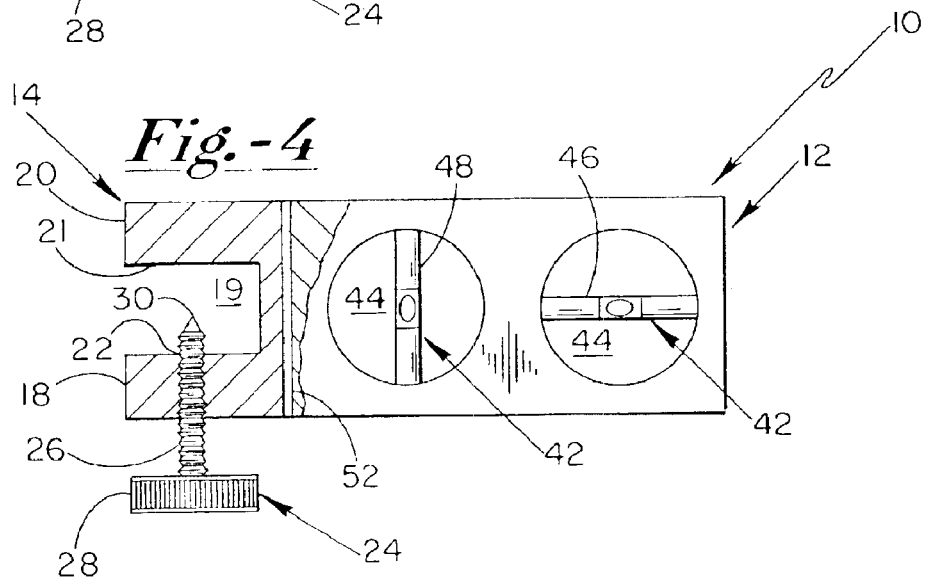

MULTIPLE AXIS LEVELING DEVICE

CROSS-REFERENCE TO RELATED APPLICATION

This application claims priority from Provisional Application Ser. No. 60/357,513, filed Feb. 15, 2002, the contents of which is incorporated herein.

FIELD OF THE INVENTION

The present invention relates to compact leveling devices generally, and more particularly to multiple axis leveling devices for removably attaching to e.g. electrical conduits so as to assist in creating accurate bends in such conduits.

BACKGROUND OF THE INVENTION

Devices for assisting a user in determining the levelness of an object or a measurement have been widely used in a variety of applications. Most typically, such leveling devices incorporate one or more levelness indicators which utilize the force of gravity on an enclosed volume of liquid. Usually, the subject liquid is encased within a transparent vial, with a portion of the volume within the vial being filled with air or other gases. Such a volume of air results in a bubble within the partially-filled vial, which gas bubble indicates levelness along a longitudinal axis of the vial by the bubbles' relative position therewithin.

A useful adaptation for such leveling devices is in removably attaching the leveling device to an object which is to be leveled. In such a manner, the user can manipulate the object to be leveled while monitoring the levelness thereof, without having to simultaneously hold and manipulate the leveling device. A particular application where such a characteristic is desired is in the bending of electrical conduit. In many cases, several sequential bends are required to be made in the electrical conduit so as to configurationally match with the particular installation. Accurate bending angles are therefore a critical aspect of the procedure. As such, it is highly desired to have a tool which is able to display levelness along multiple axes while also being self-connectable to the object of which the levelness is being measured.

Several of the sighted references discussed leveling devices that are removably attachable to selective objects. However, there remains a need in the art for a multiple-axis leveling device that is both removably attachable to selected objects and sufficiently portable so as to be easily and efficiently carried by the user, such as within a typical clothes pocket.

It is therefore a principle object of the present invention to provide a portable multiple-axis leveling device that is sufficiently portable so as to readily fit within, for example, a clothes pocket worn by a user.

It is a further object of the present invention to provide a multiple-axis leveling device having multiple distinct levelness indicators, of which at least one levelness indicator is selectively moveable into desired orientations for versatility and visibility purposes.

It is a yet further object of the present invention to provide a multiple-axis leveling device having magnetic means for self-attaching the device to selected metallic objects.

SUMMARY OF THE INVENTION

By means of the present invention, a portable multiple-axis leveling device is provided having a plurality of levelness indicators in a single unit that is sufficiently compact to be easily portable and stowable within, for example, a user's clothes pocket. The leveling device of the present invention is particularly adapted to be removably attachable to selected objects, such that the user may manipulate the selected object into desired orientations without having to simultaneously handle the leveling device. Moreover, the leveling device of the present invention incorporates integrated motion means for selectively altering the orientation of a portion of the leveling device without removing or adjusting the removably secured attachment between the leveling device and the selected object.

One embodiment of the portable multiple-axis leveling device of the present invention includes a main body portion having a plurality of distinct alignment detection means disposed therein, with each alignment detection means being configured to measure and display levelness along respective axes so that at least two distinct axes may be simultaneously measured for respective levelness without adjustment of the main body portion, and a clamping portion operably coupled to the main body portion, the clamping portion having a recessed portion for receiving selected objects therein. The leveling device further includes a securement apparatus operably coupled to the clamping portion for removably securing the clamping portion to the respective selected object that is operably positioned in the recessed portion, the main body portion and the clamping portion, in combination, is preferably less than about 6 inches in length, and less than about 3 inches in width when in alignment along a single axis, such that the leveling device is sufficiently portable to readily fit within a clothes pocket worn by a user.

In preferred embodiments of the leveling device, the alignment detection means are distinct bubble level indicators. The clamping portion may be integrally formed with the main body portion, or may be operably coupled thereto via a motion means such a hinge or swivel connection.

In some embodiments of the present invention, the main body portion of the portable multiple-axis leveling device includes a motion means such as a hinge or swivel device at least disposed between two adjacent alignment detection means. The leveling device of the present invention may further include one or more magnets disposed on at least one side of the main body portion.

BRIEF DESCRIPTION OF THE DRAWINGS

FIG. 2 is a side view of a multiple-axis leveling device of the present invention.

FIG. 3 is a side view of a multiple-axis leveling device of the present invention.

FIG. 4 is a side view of a multiple-axis leveling device of the present invention.

DETAILED DESCRIPTION OF THE PREFERRED EMBODIMENTS

Figure 1:
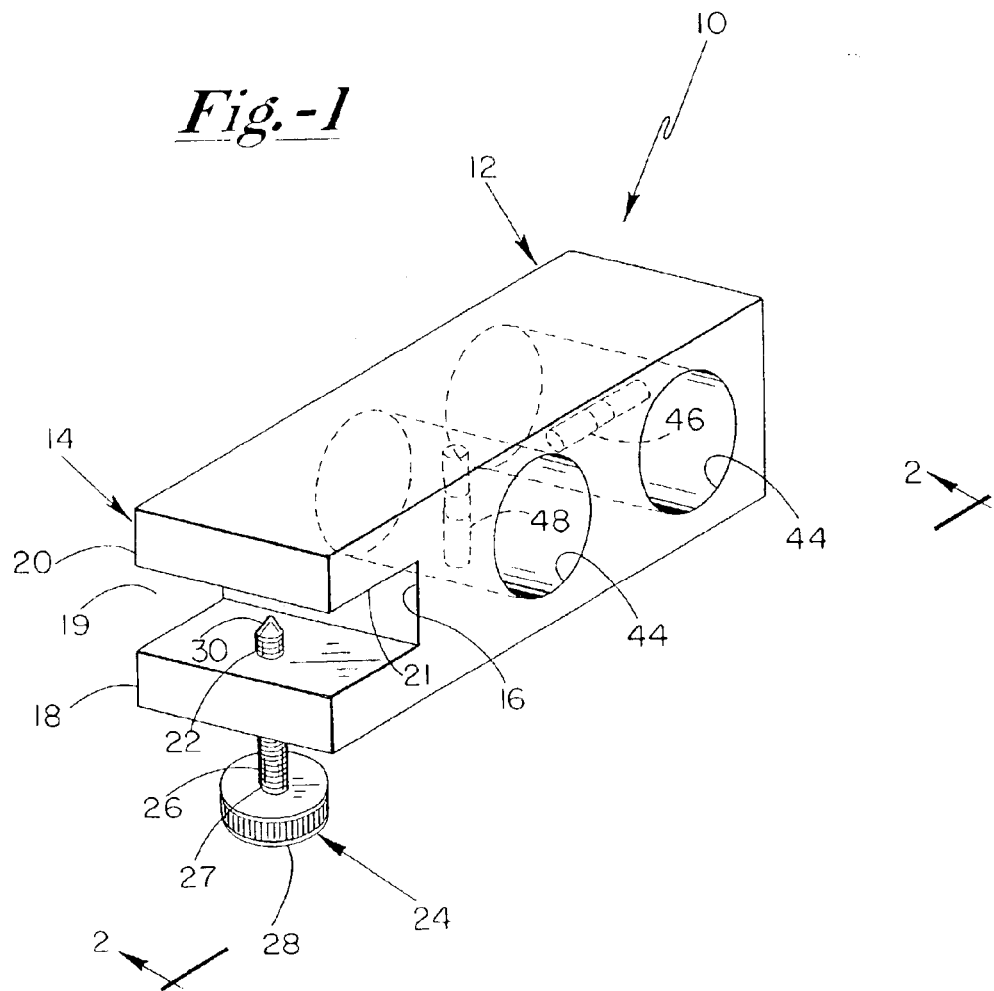
FIG. 1 is a perspective view of a multiple-axis leveling device of the present invention.

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Referring now by characters of reference to the drawings, and first to FIG. 1, a leveling device 10 is shown having a main body portion 12 and a mounting portion 14 integral therewith. Leveling device 10 may be of any desired configuration, though a compact design is preferred for portability characteristics. In the embodiment shown in FIG. 1, leveling device 10 is substantially rectangular for ease of manufacture.

Clamping portion 14 preferably comprises an open jaw configuration, such that objects to which attachment of leveling device 10 is desired may be received in recessed portion 16. Thus, clamping portion 14 generally includes a first mounting extension 18 disposed in opposing relationship with a second mounting extension 20. Such mounting extensions 18, 20 are preferably spaced from one another to form recessed portion 16. In preferred embodiments, first mounting extension 18 includes an aperture 22 disposed therein being sized and configured to receive a securing device 24 therein. In preferred embodiments, securing device 24 comprises a threaded thumbscrew having an elongated threaded portion 26 and a handle portion 28 disposed at end 27 of threaded portion 26. In such an embodiment, threaded portion 26 of securing device 24 is threadably received in aperture 22.

Securing device 24 is preferably actuated to controllably protrude into gap 19 between mounting extensions 18, 20 to thereby impact upon and secure respective objects inserted in gap 19. Securement of the respective objects in gap 19 is achieved through surface pressure on the object between end 30 of mounting device 24 and inner surface 21 of second mounting extension 20.

Main body portion 12 of device 10 preferably includes a plurality of bubble levels 42 disposed in respective channels 44. Bubble levels 42 may be more easily be seen in the cross-sectional view of FIG. 2. In preferred embodiments of the present invention, leveling device 10 includes multiple bubble levels 42 disposed in orthogonal relationship to one another such that leveling device 10 may be aligned along perpendicular axes to determine the respective levelness thereof without re-orientating leveling device 10. For example, leveling device 10 may be removably attached to an object such as electrical conduit to determine its levelness in e.g. a horizontal plane via horizontal bubble level 46. The electrical conduit may then be brought into a vertical orientation, for example through bending, and the vertical alignment of the conduit may be correspondingly determined by vertical axes bubble level 48 without adjusting the position of leveling device 10 on the electrical conduit. In such a manner, leveling device 10 is particularly useful for applications in which multiple distinct axis must be measured for levelness or trueness. The device of the present invention allows a user to quickly determine the accuracy of respective planes in which the object is oriented.

A particular example of such an application involves bending of electrical conduit. Often times, multiple bends are desired in such electrical conduit to properly "route" the conduit to certain locations. In bending such electrical conduit, it is important to ensure correct bending angles so that the conduit will properly fit upon installation. To ensure that such bending angles are correct, a leveling indicator, particularly a multiple axis leveling indicator, is useful in allowing the operator to view a levelness or trueness indicator while performing the bending operations without having to re-orient such a levelness or trueness indicator. It is also particularly important that any such leveling device be compact and portable, easily operable, inexpensive, and easily viewable. The leveling device of the present invention accomplishes these goals.

Leveling device 10 is preferably of compact construction for portability purposes. Preferably, leveling device 10 may be easily hand-held and sufficiently compact to fit into an ordinary clothes pocket. To that end, leveling device 10, as illustrated in FIG. 1, is preferably less than about 6 inches in length and less than about 3 inches in width. More preferably, leveling device 10 is about 3.5 inches in length and about 1 inch in width. In addition, leveling device 10 is preferably substantially linear so as to minimize interference with surrounding objects during use. Preferably, leveling device 10 is manufactured from a single piece of material, thereby providing durability and ease of construction. Leveling device 10 is preferably fabricated from aluminum, though a wide variety of other durable materials may be utilized in place of aluminum.

The plurality of bubble levels 42 may be disposed in leveling device 10 in any desired orientation. Preferably, however, leveling device 10 includes at least a horizontal level 46 and a vertical level 48. Bubble levels 42 are preferably disposed in a fixed configuration, though some embodiments of leveling device 10 may include at least one bubble level 42 being mounted in rotatable configuration within main body portion 12, such that any desired angle may be measured for levelness. In such embodiments, a visual scaling is provided on an outer surface of main body portion 12 to thereby align the respective bubble level 42 with a predetermined angle.

A number of variants of leveling device 10 are contemplated by the present invention. For example, leveling device 10 may include a third bubble level 42 disposed in a third orthogonal axis with respect to bubble levels 46, 48. In such a manner, the three orthogonal axes may be utilized to compare squareness of, for example, multiple bends in electrical conduit.

An alternative embodiment for determining levelness along more than two distinct axis is shown in FIG. 3. In some embodiments of the present invention, main body portion 12 of leveling device 10 may be divided into multiple distinct portions attached to one another via a hinge, swivel, or other motion-providing attachment means 52. As shown in FIG. 3, attachment means 52 may comprise a swivel by which rotatable portion 60 may be rotated into multiple predetermined orientations, including an orientation orthogonal to that shown in FIG. 3. Attachment means 52 may alternatively comprise a hinge for facilitating pivotal movement of portion 60 with respect to stationary portion 62. In such a manner, portion 60 may be pivoted while device 10 is removably attached to a specific object, so that the user may more easily view bubble level 42 disposed therewithin. Respective bubble levels 42 may be disposed in leveling portion 12 in any order or configuration desired for particular applications.

An additional feature which may be incorporated into leveling device 10 is one or more magnetic elements 70 disposed on one or more sides of leveling portion 12. Magnetic elements 70 preferably allow removable securement of leveling device 10 to a metallic structure without having to engage securement device 24 to a particular object. In such a manner, leveling device 10 may be utilized in a variety of applications, whether or not moveable securement to the object to be leveled is feasible.

In the embodiment illustrated in FIG. 3, moveable portion 60 is preferably a distinct piece from the remainder of main body portion 12, and is attached thereto via means 52. Moveable portion 60 is also preferably fabricated from the same material as the remainder of leveling device 10, though different materials may be utilized in portion 60 for desired applications.

The placement of attachment means 52 may be altered in distinct embodiments of the invention. As illustrated in FIG. 4, for example, attachment means 52 may be disposed between main body portion 12 and clamping portion 14, such that main body portion 12 may rotate or pivot in its entirety about an axis defined by attachment means 52. In the embodiment illustrated in FIG. 4, attachment means 52 is a swivel connection, but various other types of connections are contemplated by the present invention. In still further embodiments, a plurality of attachment means 52 may be provided to allow for multiplicity of motion in distinct portions 60, 62 of leveling device 10. For example, a hinge means may be provided between portions 60 and 62, and a swivel means may be provided between portion 62 and clamping portion 14. A variety of motion-providing attachment means 52 are contemplated by the present invention to further enhance the utility of leveling device 10.

Bubble levels 42 are of conventional design, and may be mounted in leveling device 10 in a fixed or moveable configuration. Other commercially available leveling indicators may be incorporated into leveling device 10 in addition to, or in place of, bubble levels 42.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A portable multiple-axis leveling device, comprising:

a main body being formed of a single piece of material and having a first substantially planar major surface and a second opposing substantially planar major surface, a first substantially planar minor surface extending between respective upper longitudinal edges of said first and second major surfaces, a second substantially planar minor surface extending between respective lower longitudinal edges of said first and second major surfaces, said second minor surface being in opposed relationship with said first minor surface, and a first substantially planar end surface extending between said first and second major surfaces and between said first and second minor surfaces at a distal end of said main body such that each of said first and second major surfaces, said first and second minor surfaces, and said first end surface are disposed in substantially orthogonal relationship with one another, said main body further including a longitudinal axis extending axially therethrough from a proximal end thereof to said distal end, and a plurality of distinct bubble level indicators disposed completely within said main body between said first and second major surfaces and between said first and second minor surfaces, each bubble level indicator being configured to measure and display levelness along respective axes such that at least two distinct axes may be simultaneously measured for respective levelness without adjustment of said main body, said main body having a clamping portion laterally formed therewith, said clamping portion having a primary substantially planar major surface coincident and coplanar with said first major surface, a secondary substantially planar major surface coincident and coplanar with said second major surface, a primary substantially planar minor surface coincident and coplanar with said first minor surface, a secondary substantially planar minor surface coincident and coplanar with said second minor surface, and a second end surface extending between said primary and secondary major surfaces and partially between said primary and secondary minor surfaces at said proximal end of said main body, said second end surface being substantially opposed to said first end surface and having a recess formed therein which extends between said primary and secondary major surfaces of said clamping portion so as to form first and second clamping arms transversely spaced apart by said recess, the recess being configured to operably receive selected objects therein; and a securement means operably coupled to said clamping portion for removably securing said clamping portion to the respective selected object operably positioned in said recess, said main body being substantially rectangular in configuration and less than about 3.5 inches in length along said longitudinal axis and less than about 1.0 inch in width along a transverse axis perpendicular to said longitudinal axis, such that said leveling device is sufficiently portable to readily fit within a clothes pocket worn by a user.

2. A portable multiple-axis leveling device as in claim 1, including magnet means disposed on at least one of said first and second minor surfaces of said main body.

* * * * *